United States Patent
Terpsma et al.

(10) Patent No.: US 7,519,256 B2
(45) Date of Patent: Apr. 14, 2009

(54) METHOD FOR MAKING AN OPTICAL FIBER PREFORM VIA INTERNAL VAPOR DEPOSITION

(75) Inventors: Jelle Philip Terpsma, Eindhoven (NL); Rob Hubertus Matheus Deckers, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/775,542

(22) Filed: Jul. 10, 2007

(65) Prior Publication Data

US 2008/0044150 A1 Feb. 21, 2008

(30) Foreign Application Priority Data

Jul. 10, 2006 (NL) .................................... 1032140

(51) Int. Cl.
*G02B 6/02* (2006.01)
(52) U.S. Cl. ........................ 385/123; 385/124; 385/125; 385/126; 65/391; 65/393
(58) Field of Classification Search ......... 385/123–126; 65/393, 391
See application file for complete search history.

(56) References Cited

U.S. PATENT DOCUMENTS

| 4,741,747 | A | 5/1988 | Geittner et al. |
| 4,944,244 | A | 7/1990 | Moisan et al. |
| 5,145,509 | A | 9/1992 | Bachmann et al. |
| 5,188,648 | A | 2/1993 | Geittner et al. |
| 7,156,046 | B2 | 1/2007 | Tamagaki et al. |
| 2003/0115909 | A1 | 6/2003 | House et al. |
| 2005/0000253 | A1 | 1/2005 | Xie et al. |
| 2005/0041943 | A1 | 2/2005 | Milicevic et al. |
| 2006/0193581 | A1 | 8/2006 | Milicevic et al. |
| 2008/0044150 | A1 | 2/2008 | Terpsma et al. |

FOREIGN PATENT DOCUMENTS

| EP | 1396554 A | 3/2004 |
| EP | 1878708 A1 | 1/2008 |
| FR | 2575151 A1 | 6/1986 |
| JP | 56078440 A | 6/1981 |

OTHER PUBLICATIONS

Dutch Search Report and Written Opinion in corresponding Dutch Application No. NL 1032140, mailed on Mar. 8, 2007.
Extended European Search Report in corresponding European Patent Application Serial No. 07012076, dated Aug. 21, 2007.

*Primary Examiner*—Jennifer Doan
(74) *Attorney, Agent, or Firm*—Summa, Additon & Ashe, P.A.

(57) ABSTRACT

The present invention relates to a method for manufacturing an optical preform by employing an internal vapor deposition process. The method uses an energy source and a substrate tube, wherein the energy source is movable over the length of the substrate tube between a point of a reversal at the supply side and a point of a reversal at the discharge side.

24 Claims, 3 Drawing Sheets

METHOD FOR MAKING AN OPTICAL FIBER PREFORM VIA INTERNAL VAPOR DEPOSITION

CROSS-REFERENCE TO PRIORITY APPLICATION

This application hereby claims the benefit of pending Dutch Application No. 1,032,140 (filed Jul. 10, 2006, at the Netherlands Industrial Patent Office), which is hereby incorporated by reference in its entirety.

FIELD OF THE INVENTION

The present invention relates to a method for manufacturing an optical preform via internal vapor deposition.

BACKGROUND OF THE INVENTION

Methods for making an optical preform via vapor deposition are known. These methods, however, yield optical preforms lacking geometric and optical uniformity.

One such method, for example, is disclosed in U.S. Pat. No. 4,741,747. This patent identifies as important deposition parameters reproducibility, the yield of the chemical reaction between the glass-forming precursors, and the deposition rate and the optical and geometric homogeneity of the material deposited on the interior of the substrate tube.

During the deposition process, however, so-called "end tapers" (also called deposition zones) where the optical and geometric properties are not sufficiently constant, can form at both ends of the substrate tube. It is known that the length of such end tapers may amount to about 15 percent of the total length of the substrate tube. Such a taper would lead to an axially non-uniform cross-section of the core after an optical fiber has been drawn from the preform. In particular, the taper forms an area in which the optical and/or geometric properties of the preform are not uniform. Such non-uniformity will lead to degradation of the transmission qualities of the optical fiber. Such taper areas in the preform cannot be used to manufacture quality optical fiber and, consequently, that portion of the preform becomes waste (as is any optical fiber drawn therefrom). Because such taper areas make up a significant part of the preform tube, the total fiber length that can be obtained from a preform is rather limited.

To prevent the occurrence of taper in an optical preform, U.S. Pat. No. 4,741,747 proposes to move the energy source (i.e., a plasma) non-linearly as a function of time in the area of at least one of the points of reversal or to change the power of the plasma over the length of the substrate tube as a function of time. Previously, a so-called "stationary velocity profile" of the resonator was used for depositing the layers on the interior of the substrate tube.

U.S. Pat. No. 5,188,648 relates to a method for reducing the taper area wherein the reciprocating movement of the plasma is interrupted at the point of reversal at the supply side of the glass-forming precursors. The duration of such interruption is set to effectively reduce the taper area at the so-called gas side of the substrate tube. This patent is specifically directed to reducing the geometric taper of the core of the optical preform.

U.S. Pat. No. 5,145,509 relates to a method for reducing the geometric taper wherein a glass rod is placed in the center of the substrate tube. The radius of the rod is set so that it amounts to maximally 0.67 and minimally 0.2 times the internal radius of the glass substrate tube (i.e., between about 0.2× and 0.67×the internal radius of the glass substrate tube). The glass rod is removed from the interior of the substrate tube upon completion of the deposition process. Thereafter, the hollow substrate tube is contracted into a solid preform under elevated temperature conditions.

U.S. Pat. No. 4,944,244 relates to a method for manufacturing optical preforms wherein the power of the energy source is continuously controlled during the deposition process based on a signal that is a function of, among other factors, the degree to which deposition of glass layers on the interior of the substrate tube takes place.

U.S. Patent Publication No. 2005/0041943 relates to a deposition method wherein the plasma is moved along a hollow substrate tube and is changed in a first end region adjacent to a reversal point, both as a function of time in the deposition process and as a function of position in the first end region. The end point of the first end region coincides with the reversal point, and the starting point is located further away from the reversal point than the deceleration point. The first end region has a length that suffices to reduce the taper in the preform.

European Patent Publication No. EP 1,396,554 relates to a system for plasma-activated chemical vapor deposition. This publication discloses feeding electromagnetic power of a microwave from antennas provided in an inner periphery portion of an annular waveguide into a reaction chamber disposed inside the waveguide. This allows plasma to be generated in the interior of the reaction chamber, thereby forming a film.

U.S. Patent Publication No. 2003/0115909 relates to a method of making an optical fiber preform assembly. The disclosed method includes forming a plasma inside a tube, thereby forming a plasma zone, and introducing a flow of at least one precursor suitable for forming glass into the plasma zone, wherein the flow comprises eddy diffusion of the flow of the precursor.

Each of the foregoing patents and patent publications are hereby incorporated by reference in their entirety.

The prior art discloses methods for manufacturing preforms wherein the optimization of the geometric taper has led to the formation of an optical taper, and vice versa. In this regard, geometric taper refers to reduced (or increased) deposition thickness at the ends of the optical preform. Optical taper refers to the outer part of an optical preform in which an optical property (e.g., refractive index) deviates from its optical set point. As will be understood by those having ordinary skill in the art, such optical deviation worsens toward the outer ends of the optical fiber preform.

There is a need, however, for a method for making optical fiber preforms that possess improved geometric and optical uniformity.

SUMMARY OF THE INVENTION

Accordingly, it is an aspect of the present invention to provide a method for manufacturing an optical preform via an internal vapor deposition process in which both the geometric taper and the optical taper are reduced if not minimized.

It is another aspect of the present invention to provide a method for manufacturing, via an internal vapor deposition process (e.g., PCVD), an optical preform from which a single mode optical fiber (kind, core, inner and outer cladding) having a stable cut-off wavelength can be produced.

It is yet another aspect of the present invention to provide a method for manufacturing an optical preform via an internal vapor deposition process, wherein the layers deposited on the interior of the substrate tube have constant diameter over the length of the substrate tube, such that the negative influence of OH-groups in the area at the outer side of the deposited layers is minimized.

It is yet another aspect of the present invention to provide a method for manufacturing an optical preform via an internal vapor deposition process, wherein a maximum length of the preform itself can be used for producing an optical fiber.

The method according to the present invention is characterized in that the velocity of the energy source for the deposition of the inner cladding is set so that the acceleration of the energy source near the point of reversal at the supply side for depositing the inner cladding is greater than the acceleration of the energy source near the point of reversal at the supply side for depositing the outer cladding.

As used herein, the term "acceleration" should be understood also to embrace the deceleration (i.e., negative acceleration) that takes place when the energy source is being moved from the discharge side to the point of reversal at the supply side. In other words, the absolute value of rate of velocity change at the supply side of the substrate tube is greater for the inner cladding deposition than for the of the outer cladding deposition. This is indicated graphically by a steeper slope in the velocity profile. See FIG. 1.

In this regard and with reference to FIG. 1, compared with a conventional cladding deposition (segment BX), at the supply side of the substrate tube, the outer cladding deposition follows a relatively longer ramp (segment BC) whereas the inner cladding deposition follows a relatively shorter ramp (segment BD). In effect, as compared with conventional processes, the present invention achieves improved optical properties in the inner cladding by increasing the acceleration (i.e., segment BD) during deposition of the inner cladding.

When such velocities of the energy source are used for depositing both the inner cladding and the outer cladding, the inner cladding is optimized for optical parameters, such as the refractive index, particularly when the cladding layers are doped. A cladding layer built up of pure silicon dioxide (i.e., $SiO_2$) will not exhibit any optical taper.

The geometric taper of the inner cladding that occurs therewith is compensated by the special deposition conditions of the outer cladding. In this regard, the present invention achieves satisfactory geometry by decreasing the acceleration (i.e., segment BC) during deposition of the outer cladding. In effect, the initial deposition of the outer cladding compensates for the geometric taper of the inner cladding before the deposition of the inner cladding.

With respect to geometric taper, the ratio of total cladding diameter (b) to the core diameter (a) is substantially constant over the length of the substrate tube. Stated differently, this b/a ratio (wherein a represents the core diameter and b represents the cladding outer diameter, i.e., inner cladding+outer cladding) is constant over substantially the entire length of the substrate tube.

The present inventors have furthermore found that the effect of a substantially constant ratio b/a on attenuation—particularly the attenuation at a wavelength of 1385 nanometers, which is ascribed to the influence of OH-groups—is practically constant over the length of the preform. At the same time, the stability of the cut-off wavelength over the length of the substrate tube is improved. Based on the perception that it is desirable to optimize the inner cladding for optical parameters and to subsequently compensate the resulting geometric taper of the inner cladding with a geometric taper of the outer cladding, it has appeared to be possible to maintain a constant value for the ratio b/a over substantially the entire length of the substrate tube.

In a particular embodiment and as further described herein, the energy source's constant-velocity distance between the supply side and the discharge side for depositing the inner cladding (i.e., segment D-E in FIG. 1) is typically greater than the energy source's constant-velocity distance between the supply side and the discharge side for depositing the outer cladding (i.e., segment C-E in FIG. 1). As used herein, the term "constant-velocity" distance refers to the length over which the velocity of the energy source is relatively constant during deposition of the glass-forming precursors.

With regard to preventing the occurrence of the "end taper," it is preferable if the velocity of the energy source at the discharge side is substantially the same for the deposition of the outer cladding as for the deposition of the inner cladding. In this regard, the inventors have found that end taper tends to be less pronounced at the discharge side of the substrate tube and that reduced residence time there is best (i.e., employing a short ramp as depicted in segment AE of FIG. 1's velocity profile). Indeed, the discharge-side acceleration of the energy source for the deposition of both the outer cladding and the inner cladding may be greater than the supply-side acceleration of the energy source for deposition of the inner cladding (i.e., AE is steeper than segment BD).

Based on the present method it appears possible to obtain a uniform cut-off wavelength over the entire length of the optical fiber to be made from such a preform. In addition, the present inventors have found that the so-called OH peak (i.e., attenuation at a wavelength of 1385 nanometers) is substantially uniform over the entire length of the optical fiber.

In another particular embodiment, the velocity of the energy source during the deposition of the outer cladding may be increased while the energy source is moving in the direction of the discharge side, after the acceleration thereof at the supply side; likewise, the velocity of the energy source during the deposition of the inner cladding may be increased while the energy source is moving in the direction of the discharge side, after the acceleration thereof at the supply side.

To obtain a high deposition rate as well as a reproducible deposition method, it is desirable to use as the energy source a resonator for generating plasma.

In yet another aspect, the present invention relates to an optical preform obtained by carrying out the foregoing method, wherein the ratio b/a is substantially constant over the length of the preform, wherein:

a=the core diameter, and b=the (inner+outer) cladding outer diameter.

The present invention further pertains to an optical fiber drawn from a preform that is formed according to the present invention. In particular, this aspect of the present invention relates to single mode optical fibers comprising a core that is directly surrounded by an inner cladding, which itself is directly surrounded by an outer cladding.

In principle, the present invention is applicable to optical fibers in which two or more adjacent rings are present, wherein at least one ring must be optimized for optical properties and at least one other ring must be optimized for geometric properties.

Specifically for a two-layer single mode profile the following limits subsequently apply with respect to the outer diameter (in the fiber):

$12 < b' < 30$ [µm], and $15 < b < 60$ [µm]

wherein, b'=the inner cladding outer diameter, b=the outer cladding outer diameter.

For instance, a single mode optical fiber in which the diameter of the core (a) is approximately 9 microns yields the following ratios:

$$1.3 < b'/a < 3.3, \text{ and}$$

$$1.7 < b/a < 6.7.$$

Other advantages and features of the invention will become apparent upon reading the following description of non-limiting invention embodiments, which are provided by way of example and with reference to the appended drawings.

DETAILED DESCRIPTION

In one aspect, the present invention embraces a method for manufacturing an optical preform via an internal vapor deposition process in a way that significantly improves optical taper in the inner cladding and yet maintains acceptable preform geometry.

As compared with prior methods, the process according to the present invention achieves a meaningful improvement in manufacturing efficiency and yield (i.e., less waste). For example, the present invention as described herein yields a glass substrate tube whose glass-deposition region (i.e., the interior region onto which glass layers are deposited) may be used at a high efficiency (e.g., 70-75 percent or more) to manufacture quality optical fibers (i.e., possessing satisfactory geometric and optical properties). Those having ordinary skill in the art will appreciate that the glass-deposition region is defined by the shortest glass layer (e.g., the core) deposited on the interior of the glass substrate tube and thus typically reflects the portion of the glass substrate tube that is usable for making a preform.

The process makes use of an energy source and a substrate tube having outer ends, namely a supply side and a discharge side. The energy source is movable over the length of the substrate tube between a point of a reversal at the supply side and a point of a reversal at the discharge side. One or more glass-forming precursors, which may or may not be doped, are supplied to the interior of the substrate tube at the supply side of the substrate tube. The mixture of unreacted and/or excess glass-forming precursors, which are not deposited on the interior of the substrate tube, and gases (e.g., chlorine) that form during deposition-related chemical reactions (i.e., non-deposited components) are discharged at the discharge side of the substrate tube. Conditions in the interior of the substrate tube promote the deposition of glass layers on the interior of the substrate tube. In this regard, an outer cladding is deposited first and an inner cladding is deposited thereafter. Then, a core layer is deposited and the substrate tube is consolidated (e.g., collapsed and end-trimmed) into an optical preform.

Figure 1:
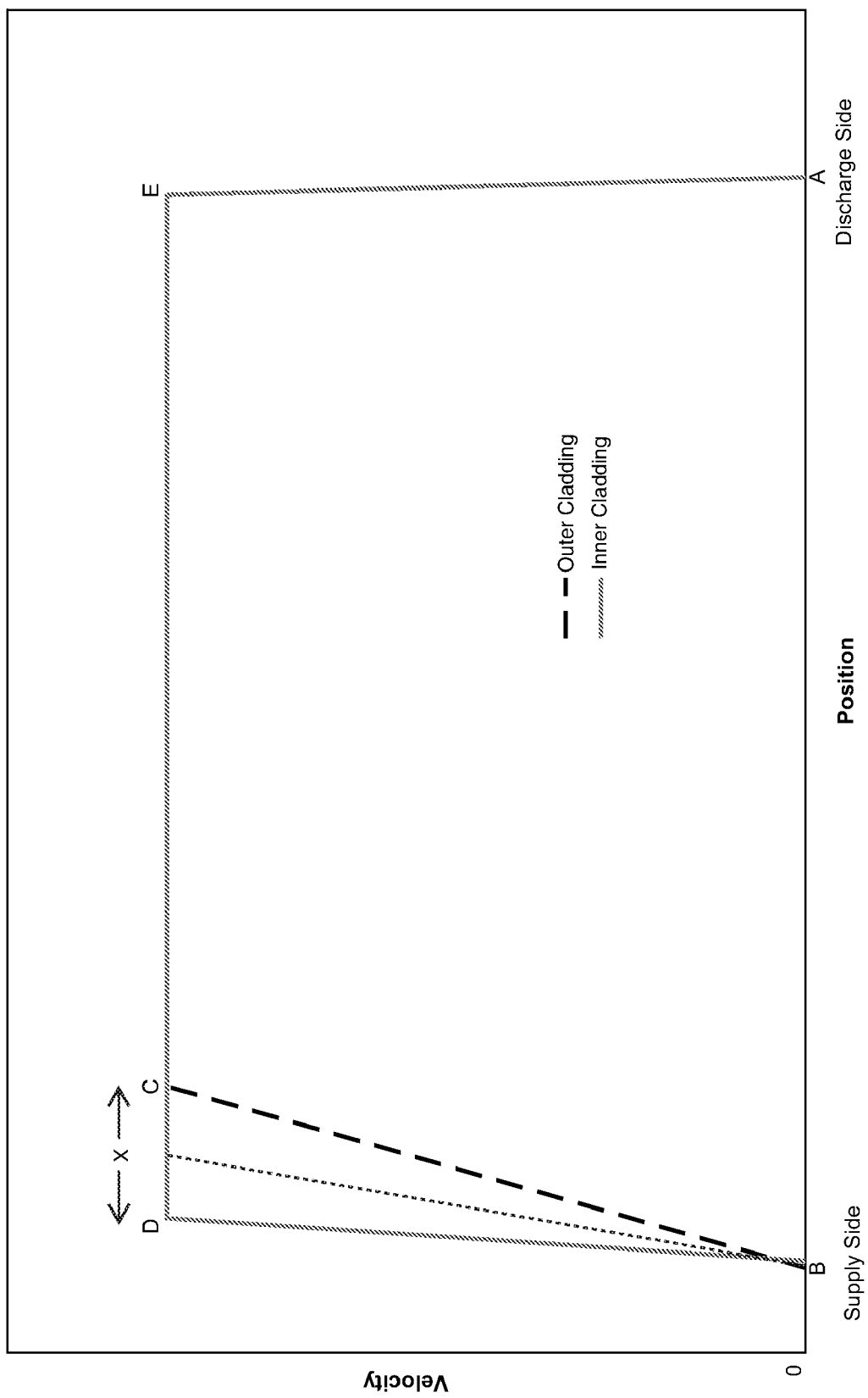
FIG. 1 depicts a velocity profile of the energy source according to the present method.

FIG. 1 schematically represents the deposition process as carried out in accordance with the present method. FIG. 1 schematically shows the velocity profile for the deposition of both the inner cladding and the outer cladding over the glass-deposition region between points A and B. By way of illustration, a typical deposition distance is between 75 and 85 percent of the length of the glass substrate (e.g., a 1300-millimeter deposition region for a 1600-millimeter glass substrate tube).

The process according to the present invention typically achieves a glass substrate from which at least 70 percent (e.g., about 75-80 percent or more) of the glass-deposition region (i.e., the interior region onto which glass layers are deposited) may be used to manufacture optical fibers possessing satisfactory geometric and optical properties. (As a practical matter and by way of illustration, this means that about 55-65 percent of the length of the glass substrate tube is used in high-quality optical fibers.) Moreover, the length of the final preform made according to the present invention is at least about 70 percent of the length of the glass substrate tube's glass-deposition region, typically 75 percent or more (e.g., 80 percent or so).

At the beginning of the deposition process, the outer cladding is deposited on the interior of the substrate tube, while the energy source is reciprocated over the substrate tube between points A and B. It will be understood that the interior of the substrate tube may already be provided with one or more layers, such as previously deposited buffer layers, which may or may not be doped. When the energy source is located at point of reversal B (i.e., the supply side of the substrate tube), the velocity of the energy source is subsequently increased to a maximum velocity, indicated at C. (As noted, segment BC is a relatively longer ramp as compared to conventional processes, denoted BX.) Then, the velocity of the energy source in the direction toward point of reversal A is typically kept substantially constant, and at point of reversal A the velocity of the energy source will again be practically zero, with deceleration, of course, taking place near point E. In practice, the outer cladding is typically formed by repeating the velocity profile shown in FIG. 1, for instance, between about 100 and 1,000 or more cycles.

After the outer cladding has been deposited on the interior of the hollow substrate tube according to such a velocity profile, the inner cladding is deposited on the outer cladding that is already present in the interior of the substrate tube. The deposition process of the inner cladding takes place according to a velocity profile that is different from that of the deposition process of the outer cladding. In particular, the initial deposition of the outer cladding follows a long ramp as depicted in segment BC. In contrast, the subsequent deposition of the inner cladding follows a short ramp as depicted in segment BD. Those having ordinary skill in the art will appreciate that these respective ramps according to the present invention are distinguishable from the conventional ramp depicted in segment BX (i.e., a compromise between geometric taper and optical taper).

Near point of reversal B, which is located at the supply side of the substrate tube, the velocity of the energy source is increased very quickly to a level D. (As noted, segment BD is a relatively shorter ramp as compared to conventional processes, denoted BX.). After its acceleration to point D, the energy source is further moved in the direction toward point of reversal A, typically at a substantially constant velocity.

Near point E the velocity of the energy source is reduced such that the velocity is zero at point of reversal A. Thereafter, the energy source returns to point of reversal B according to the velocity profile that is shown in FIG. 1, and vice versa.

Those having ordinary skill in the art will understand that total cladding thickness should be as uniform as possible over the entire length of a preform. Moreover, the total cladding must be sufficiently thick to inhibit impurities that may diffuse through the cladding into the core of the optical fiber after the preform is either sleeved (e.g., with a sleeving tube)

or overcladded (e.g., with silica particles). Such impurities (e.g., water or metals) can adversely affect the attenuation properties of the resulting optical fiber.

In contrast to other processes, the present invention achieves substantially uniform preform geometry and outstanding inner cladding optical properties by first augmenting the outer cladding in anticipation of the geometric taper that will ensue during optimization of the inner cladding. In brief, the exemplary velocity profile of the present invention as depicted in FIG. 1 employs (i) a long ramp for the deposition of the outer cladding, which yields greater deposition at the supply side of the substrate tube, and (ii) a short ramp for the deposition of the inner cladding, which, although creating geometric taper, achieves outstanding optical properties. In contrast, a conventional, supply-side velocity profile demands a compromise between optical and geometric properties. Consequently, the conventional velocity profile (i.e., segment BX) falls between the aforementioned velocity trajectories of the present invention (i.e., segments BD and BC, respectively).

In another embodiment, after initial acceleration, the velocity of the energy source is increased slightly (e.g., 5 percent or so) as it moves toward the discharge side. Thus, with respect to this embodiment, the aforementioned constant-velocity distances as depicted in the velocity profile (e.g., segments CE and DE, respectively) will instead include a slightly upward slope. See FIG. 1.

More specifically, during the deposition of the outer cladding, the velocity of the energy source slightly increases (i.e., from point C to point E as depicted in the velocity profile of FIG. 1). Likewise, during the deposition of the inner cladding, the velocity of the energy source slightly increases (i.e., from point D to point E as depicted in the velocity profile of FIG. 1). Surprisingly, the inventors have found that for some deposition processes such an increase in energy source velocity yields improved optical properties in the cladding layers (i.e., achieves a more stable refractive index without adversely affecting geometrical properties).

Figure 2:
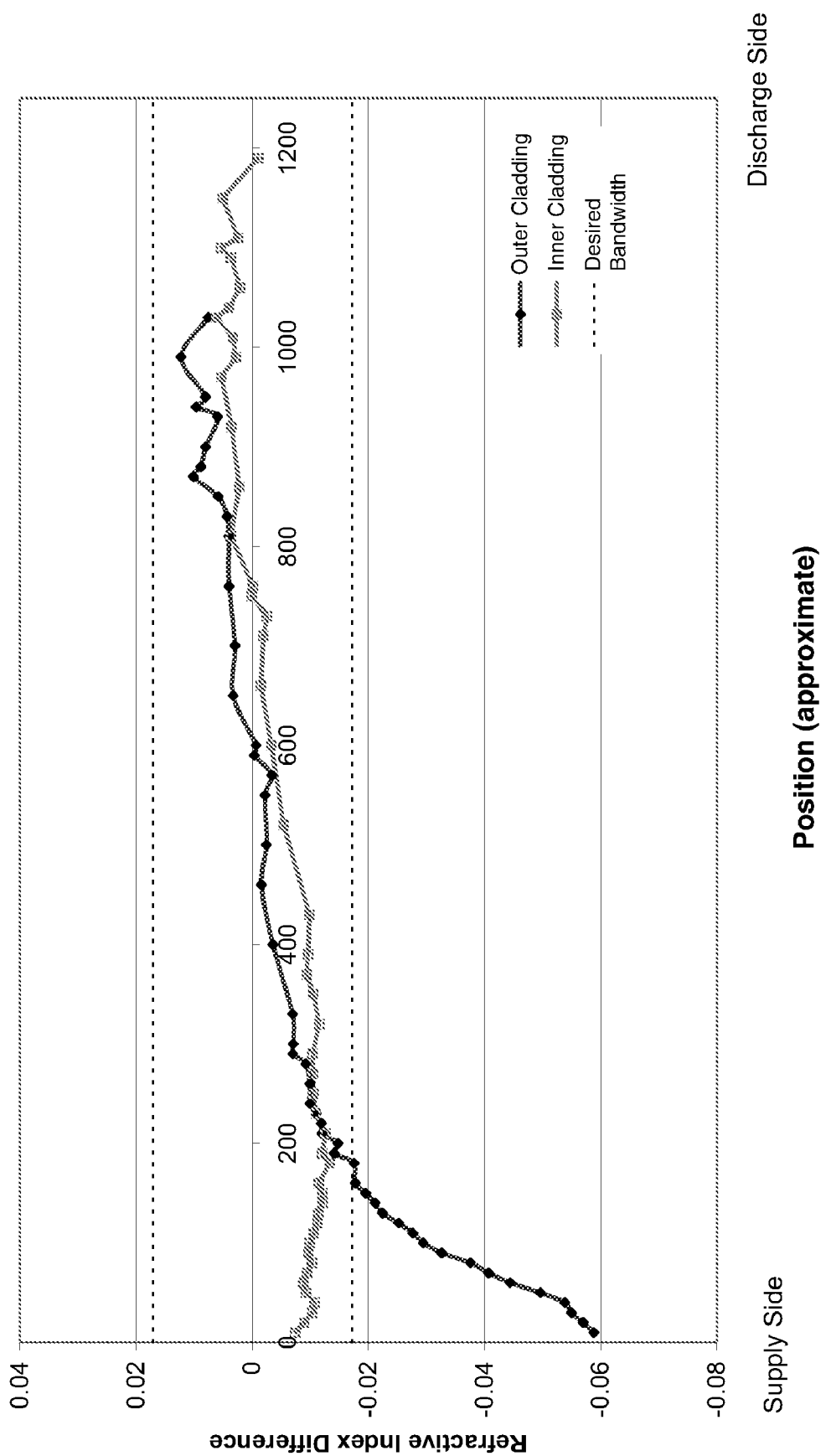
FIG. 2 depicts the difference in the refractive index along a preform made according to the present invention.

FIG. 2 shows the relative refractive index difference (y-axis) as a function of the preform position (x-axis) obtained using the method shown in FIG. 1. FIG. 2 shows that the refractive index difference, measured in relation to the refractive index value in the center (i.e., the average refractive index near the midpoint) of the preform, falls within a desired bandwidth (e.g., between about ±0.017 percent) over substantially the entire length of the preform (e.g., 90 percent of the final preform length, typically 95 percent or more of the final preform length). In this regard, a suitable bandwidth for the inner cladding has limits of ±0.02 percent.

Moreover, even tighter tolerances may be achieved for the inner cladding (e.g., ±0.01 percent or less) for 50 percent or more of the final preform length (e.g., more than about 70 percent of the final preform length).

The relative refractive index difference depicted in FIG. 2 is defined as follows:

$$\Delta_{RI,z}=(n_{measured}-n_{reference})\div n_{reference}\times 100\%$$

wherein:

$n_{measured}$=the measured refractive index at a particular position, z, along the length of the preform, and $n_{reference}$=the average refractive index in the center of the preform.

With respect to FIG. 2, the average refractive indices in the center of the preform were determined (i) for the outer cladding in a region of the preform from about 400 millimeters to about 800 millimeters as measured from the supply side of the optical preform and (ii) for the inner cladding in a region of the preform from about 500 millimeters to about 900 millimeters as measured from the supply side of the optical preform. In establishing a suitable bandwidth (and the reference refractive index, $n_{reference}$), the substantially uniform region near the center of the optical preform suffices. This may be, for example, a region in the center of the preform as depicted in FIG. 2 or a distinct position, such as the preform's midpoint.

Figure 3:
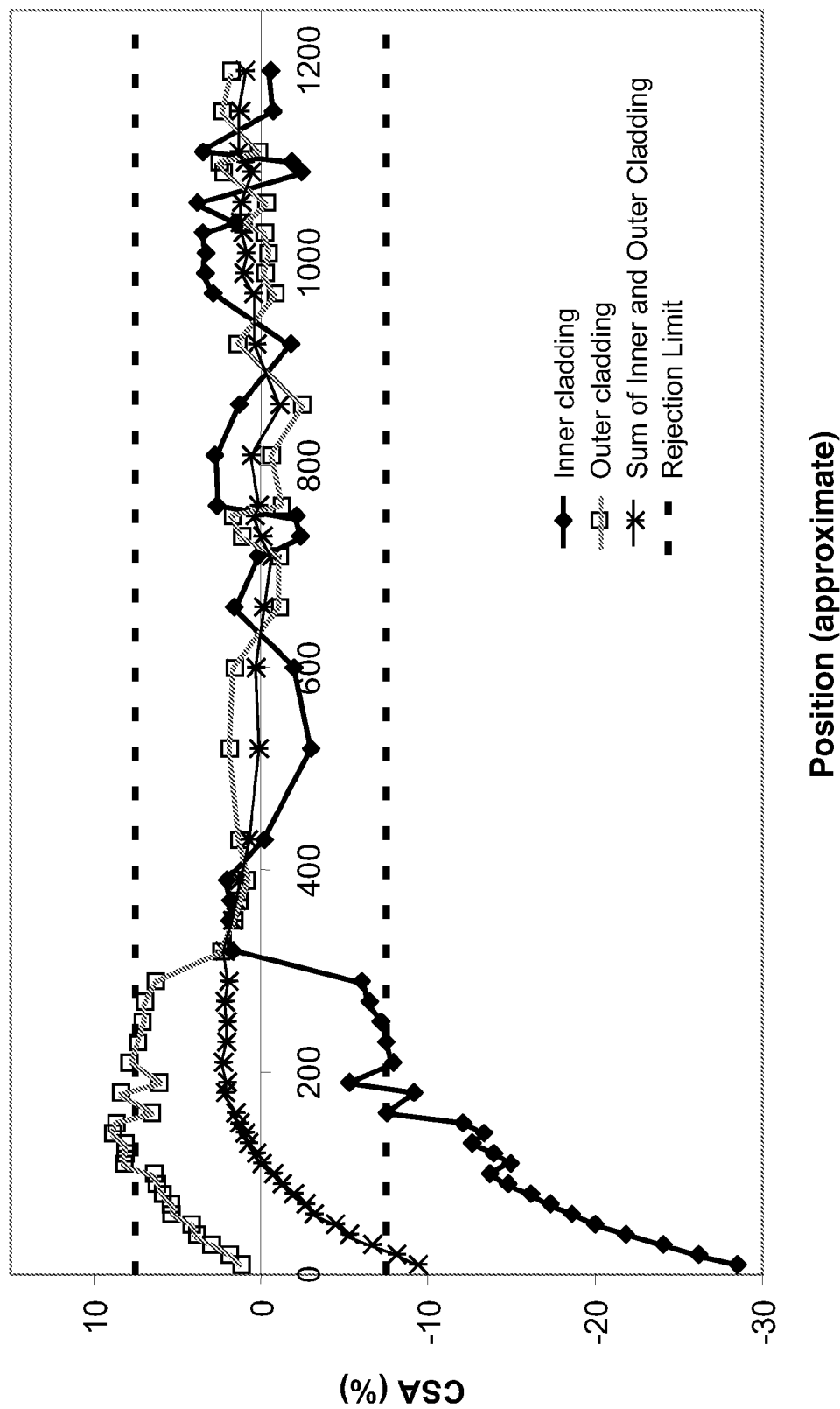
FIG. 3 depicts the cross-sectional area both of the inner cladding and of the outer cladding along a preform made according to the present invention.

In FIG. 3, the relative difference of the amount of deposited material of the inner cladding and the outer cladding (y-axis) is schematically represented as a function of preform position (x-axis). It also appears that the sum of the relative differences of the amount of deposited material of the inner cladding and the outer cladding ranges within a desired bandwidth (e.g., ±7.5 percent, typically ±5 percent) over substantially the entire length of the preform (e.g., 90 percent of the preform length, especially 95 percent or more of the preform length).

The relative difference is measured by comparing the area of a particular section, measured on the basis of the inner diameter and the outer diameter of such a section, with that of the area in the center of the preform, viz:

$$\Delta_{CSA,z}=(CSA_z-CSA_{ref})\div CSA_{ref}\times 100\%$$

wherein:

$CSA_z$=the cross-sectional area at a particular position, z, along the length of the preform, and $CSA_{ref}$=the average cross-sectional area in the center of the preform.

CSA is defined as:

$$CSA=(\pi/4)\times(d_u^2-d_i^2)$$

wherein:

$d_u$=the outer diameter of the layer, and $d_i$=the inner diameter of the layer.

In establishing a suitable CSA bandwidth (and the reference cross-sectional area, $CSA_{ref}$), the substantially uniform region near the center of the optical preform suffices. As described previously in the context of a refractive index reference, this may be, for instance, a region in the center of the preform (e.g., the preform's central third) or a distinct central position (e.g., the preform's midpoint).

Those having ordinary skill in the art will appreciate that the foregoing equations have general application and may be employed to characterize the inner cladding and the outer cladding, either separately or in combination. FIG. 3, in fact, depicts the respective cross-sectional area differences in just this way.

It should be noted that equipment limitations with respect to handling preforms longer than one meter made it necessary to determine the optical preform's refractive index (FIG. 2) and cross-sectional area (FIG. 3) in two measurements. In particular, to characterize the entire 1050-millimeter optical preform, both refractive index and cross-sectional area were measured (i) from the supply side toward the center and (ii) from the discharge side toward the center. Consequently, toward the midpoint of the preform, refractive index and cross-sectional area were measured twice, and the data presented in FIGS. 2 and 3 appear to reflect this overlap. This has the effect of extending the curves somewhat (e.g., about 5-15 percent) near the center of respective figures (and corresponding to the central region of the optical preform). Consequently, in FIGS. 2 and 3, the positional references, which are nominally in millimeters, are approximate. Even so, those having ordinary skill in the art will appreciate that FIGS. 2 and 3 satisfactorily describe the tapering effects (e.g., geometric and optical) achieved according to the present invention, particularly with respect to the supply side of the optical preform.

The present inventors have thus found that they can manufacture an optical preform whose inner cladding is optimized for optical parameters and whose geometry is not adversely affected. In accordance with the foregoing, the present invention facilitates this by pre-compensating for the expected geometric taper that will occur during the optical optimization of the inner cladding. In this way, the ratio b/a is substantially constant over the entire length of the optical preform (i.e., wherein b is the diameter of the total cladding and a is the diameter of the core). When such a method is used, it is possible to keep the deposition time short without adversely affecting the optical performance of the optical fiber obtained from a preform thus produced (e.g., the attenuation caused by OH groups).

Furthermore, the inventors have found that the present method achieves cut-off wavelength that is substantially uniform over the length of the optical fiber. The present inventors have also found that if a constant b/a ratio is targeted, the value of the OH peak at a wavelength of 1385 nanometers will be substantially uniform over the length of the single mode optical fiber that includes at least an inner cladding and an outer cladding surrounding a core.

In the specification and the figures, typical embodiments of the invention have been disclosed. Specific terms have been used only in a generic and descriptive sense, and not for purposes of limitation. The scope of the invention is set forth in the following claims.

The invention claimed is:

1. A method for manufacturing an optical preform via an internal vapor deposition process, wherein use is made of an energy source and a substrate tube having a supply side and a discharge side, wherein the energy source is movable over the length of the substrate tube between a supply-side point of reversal and a discharge-side point of reversal, wherein one or more glass-forming precursors are supplied to the interior of the substrate tube at the supply side of the substrate tube, and wherein components that have not been deposited on the interior of the substrate tube are discharged at the discharge side of the substrate tube, wherein such conditions are created in the interior of the substrate tube that deposition of glass layers on the interior of the substrate tube takes place, wherein first an outer cladding is deposited and then an inner cladding is deposited, and wherein the velocity profile of the energy source is set so that the acceleration of the energy source near the supply-side point of reversal for depositing the inner cladding is greater than the acceleration of the energy source near the supply-side point of reversal for depositing the outer cladding.

2. A method according to claim 1, wherein the constant-velocity distance between the supply side of the substrate tube and the discharge side of the substrate tube for depositing the inner cladding is longer than the constant-velocity distance between the supply side of the substrate tube and the discharge side of the substrate tube for depositing the outer cladding.

3. A method according to claim 1, wherein the velocity profile of the energy source near the discharge side of the substrate tube is substantially the same for the deposition of the outer cladding as for the deposition of the inner cladding.

4. A method according to claim 1, wherein the velocity of the energy source during the deposition of the outer cladding is increased while the energy source is moving in the direction of the discharge side, after the acceleration thereof at the supply side.

5. A method according to claim 1, wherein the velocity of the energy source during the deposition of the inner cladding is increased while the energy source is moving in the direction of the discharge side, after the acceleration thereof at the supply side.

6. A method according to claim 1, wherein the discharge-side acceleration of the energy source for the deposition of both the outer cladding and the inner cladding is greater than the supply-side acceleration of the energy source for deposition of the inner cladding.

7. A method according to claim 1, wherein the energy source comprises a plasma-generating resonator.

8. A method according to claim 1, further comprising the step of consolidating the substrate tube to yield an optical preform in which the ratio of the preform's total cladding diameter to the preform's core diameter is substantially constant over the length of the preform.

9. A method according to claim 8, wherein the length of the preform is at least about 75 percent of the length of the substrate tube's glass-deposition region.

10. A method according to claim 8, wherein $\Delta_{CSA,z}$ is within ±7.5 percent for at least about 90 percent of the total length of the preform according to the following equation:

$$\Delta_{CSA,z} = (CSA_z - CSA_{ref}) \div CSA_{ref} \times 100\%$$

wherein,
$CSA_z$=the total cross-sectional area of the inner cladding and the outer cladding at position z, and
$CSA_{ref}$=the average cross-sectional area in the center of the preform.

11. A method according to claim 8, wherein, for 90 percent of the total length of the preform, the relative refractive index difference ($\Delta_{RI,z}$) of the inner cladding is within ±0.02 percent, wherein the relative refractive index difference is defined as:

$$\Delta_{RI,z} = (n_{measured} - n_{reference}) \div n_{reference} \times 100\%$$

wherein,
$n_{measured}$=the measured refractive index at position z, and
$n_{reference}$=the average refractive index in the center of the preform.

12. A method according to claim 8, further comprising the step of drawing an optical fiber from the preform, wherein, for a single mode profile, the ratio of the fiber's inner cladding outer diameter to the fiber's core diameter is between 1.3 and 3.3.

13. A method according to claim 8, further comprising the step of drawing an optical fiber from the preform, wherein, for a single mode profile, the ratio of the fiber's outer cladding outer diameter to the fiber's core diameter is between 1.7 and 6.7.

14. A method according to claim 8, further comprising the step of drawing an optical fiber from the preform, wherein the outer diameter of the fiber's inner cladding ranges from 12 to 30 microns.

15. A method according to claim 8, further comprising the step of drawing an optical fiber from the preform, wherein the outer diameter of the fiber's outer cladding ranges from 15 to 60 microns.

16. A method for manufacturing an optical preform via an internal vapor deposition process, comprising:
providing a substrate tube having a supply side and discharge side;
forming an outer cladding on the interior of the substrate tube;
then forming an inner cladding on the outer cladding; and then consolidating the substrate tube to yield an optical preform having a length that is at least 70 percent of the length of the substrate tube's glass-deposition region;

wherein the step of forming the inner cladding achieves a substantially uniform refractive index in the inner cladding such that the relative refractive index difference ($\Delta_{RI,z}$) between (i) the refractive index values for longitudinal positions along the preform's length and (ii) the reference refractive index value in the center of the preform is within a refractive-index bandwidth of ±0.02 percent for at least about 90 percent of the preform's length; and wherein the steps of forming the outer cladding, forming the inner cladding, and consolidating the substrate tube together yield an optical preform possessing substantially uniform cross-section along the length of the preform such that, for at least about 90 percent of the preform's length, $\Delta_{CSA,z}$ is within ±7.5 percent according to the following equation:

$$\Delta_{CSA,z} = (CSA_z - CSA_{ref}) \div CSA_{ref} \times 100\%$$

wherein, $CSA_z$=the total cross-sectional area of the inner cladding and the outer cladding at position z, and $CSA_{ref}$=the reference cross-sectional area of the inner cladding and the outer cladding in the center of the preform.

17. A method according to claim 16, further comprising the step of forming a core on the inner cladding prior to the step of consolidating the substrate tube.

18. A method according to claim 16, wherein the step of consolidating the substrate tube to yield an optical preform comprises collapsing the substrate tube and removing a portion of its supply-side end and/or a portion of its discharge-side end.

19. A method according to claim 16, wherein the optical preform has a length that is at least 80 percent of the length of the substrate tube's glass-deposition region.

20. A method according to claim 16, wherein:
the reference refractive index value in the center of the preform is defined by the refractive index at the preform's midpoint; and
the reference cross-sectional area of the inner cladding and the outer cladding in the center of the preform ($CSA_{ref}$) is defined at the preform's midpoint.

21. A method according to claim 16, wherein:
the reference refractive index value in the center of the preform is defined by the average refractive index in the preform's central third; and
the reference cross-sectional area of the inner cladding and the outer cladding in the center of the preform ($CSA_{ref}$) is an average over the preform's central third.

22. A method according to claim 21, wherein the steps of forming the outer cladding, forming the inner cladding, and consolidating the substrate tube together yield an optical preform possessing substantially uniform cross-section along the length of the preform such that, for at least about 90 percent of the preform's length, $\Delta_{CSA,z}$ is within ± 5 percent.

23. A method for cladding a glass substrate tube via vapor deposition, comprising:
providing a glass substrate tube having a supply side and discharge side;
forming an outer cladding on the interior of the glass substrate tube via vapor deposition; and
forming an inner cladding on the outer cladding via vapor deposition, wherein at the supply side of the glass substrate tube, the velocity-profile ramp corresponding to the inner cladding deposition is substantially shorter than the velocity-profile ramp corresponding to the outer cladding deposition;

wherein the outer cladding and inner cladding together define a glass-deposition region on the interior surface of the glass substrate tube, the length of the glass-deposition region being shorter than the length of the glass substrate tube;

wherein, over at least about 75 percent of the length of the glass-deposition region, the inner cladding's relative refractive index difference ($\Delta_{RI,z}$) between (i) the refractive index values for longitudinal positions along the length of the glass-deposition region and (ii) the reference refractive index value at the midpoint of the glass-deposition region is within a refractive-index bandwidth of ±0.02 percent; and wherein, over at least about 75 percent of the length of the glass-deposition region, $\Delta_{CSA,z}$ is within ±7.5 percent according to the following equation:

$$\Delta_{CSA,z} = (CSA_z \div CSA_{ref}) \div CSA_{ref} \times 100\%$$

wherein, $CSA_z$=the total cross-sectional area of the inner cladding and the outer cladding at position z, and $CSA_{ref}$=the reference cross-sectional area of the inner cladding and the outer cladding at the midpoint of the glass-deposition region.

24. A method according to claim 23, wherein over at least about 80 percent of the length of the glass-deposition region, $\Delta_{RI,z}$ for the inner cladding is within ±0.02 percent and $\Delta_{CSA,z}$ is within ±5 percent.

* * * * *

UNITED STATES PATENT AND TRADEMARK OFFICE
CERTIFICATE OF CORRECTION

PATENT NO. : 7,519,256 B2
APPLICATION NO. : 11/775542
DATED : April 14, 2009
INVENTOR(S) : Jelle Philip Terpsma et al.

It is certified that error appears in the above-identified patent and that said Letters Patent is hereby corrected as shown below:

<u>In the Claims:</u>

Claim 23, Line 38 reads: "$(CSA_z \div CSA_{ref}) \div CSA_{ref} \times 100\%$"
and should read: "$(CSA_z - CSA_{ref}) \div CSA_{ref} \times 100\%$"

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,519,256 B2
APPLICATION NO. : 11/775542
DATED : April 14, 2009
INVENTOR(S) : Jelle Philip Terpsma et al.

It is certified that error appears in the above-identified patent and that said Letters Patent is hereby corrected as shown below:

<u>In the Claims:</u>

Column 12, Claim 23, Line 38 reads: "$(CSA_z \div CSA_{ref}) \div CSA_{ref} \times 100\%$"
and should read: "$(CSA_z - CSA_{ref}) \div CSA_{ref} \times 100\%$"

This certificate supersedes the Certificate of Correction issued November 10, 2009.

Signed and Sealed this

First Day of December, 2009

David J. Kappos
*Director of the United States Patent and Trademark Office*